United States Patent
Copple et al.

(10) Patent No.: US 6,178,408 B1
(45) Date of Patent: Jan. 23, 2001

(54) METHOD OF REDEEMING COLLECTIBLE POINTS

(75) Inventors: Brenda Ellen Copple; Kristin Elizabeth Creed, both of Dallas, TX (US)

(73) Assignee: Recot, Inc., Pleasanton, CA (US)

( * ) Notice: Under 35 U.S.C. 154(b), the term of this patent shall be extended for 0 days.

(21) Appl. No.: 09/353,328

(22) Filed: Jul. 14, 1999

(51) Int. Cl.$^7$ .................................................... G06F 17/60
(52) U.S. Cl. .................................. 705/14; 705/26; 705/37
(58) Field of Search ................................... 705/10, 14, 26, 705/37

(56) References Cited

U.S. PATENT DOCUMENTS

| | | |
|---|---|---|
| 5,056,019 | 10/1991 | Schultz et al. . |
| 5,483,444 | 1/1996 | Heintzeman et al. . |
| 5,537,314 | 7/1996 | Kanter . |
| 5,734,838 | 3/1998 | Robinson et al. . |
| 5,774,870 | 6/1998 | Storey . |
| 5,778,367 | 7/1998 | Wesinger . |
| 5,794,210 | 8/1998 | Goldhaber . |
| 5,794,219 | 8/1998 | Brown . |
| 5,806,045 | 9/1998 | Biorge et al. . |
| 5,835,896 * | 11/1998 | Fisher et al. ............................. 705/37 |
| 5,855,008 * | 12/1998 | Goldhaber et al. ..................... 705/14 |
| 5,890,138 | 4/1999 | Godin et al. . |
| 5,905,975 | 5/1999 | Ausubel . |
| 5,914,472 * | 6/1999 | Foladare et al. ....................... 235/380 |
| 5,923,016 | 7/1999 | Fredregill et al. . |
| 5,937,391 | 8/1999 | Ikeda et al. . |
| 5,983,196 * | 11/1999 | Wendkos ................................. 705/14 |
| 6,009,411 | 1/2000 | Kepecs . |
| 6,009,412 | 12/1999 | Storey . |
| 6,012,045 * | 1/2000 | Barzilai et al. ......................... 705/37 |
| 6,055,573 * | 4/2000 | Garderswartz et al. .............. 709/224 |
| 6,061,660 * | 5/2000 | Eggleston et al. ..................... 705/14 |
| 6,075,971 * | 6/2000 | Williams et al. ...................... 455/5.1 |

OTHER PUBLICATIONS

Rebecca Quick, "Online: New Web Sites Let Kids Shop, Like, Without Credit Cards", Wall Street Journal, Jun. 14, 1999, p. B1.*

"MyPoints Online Rewards Program Gains Industry Momentum with 36 New Partners", PR Newswire, Aug. 17, 1998.*

"Bid.com Launches Personalized Marketing Service for Its Customers", Canadian Corporate News, Nov. 5, 1998.*

"Bidnow.com, inc. to begin Internet Auctions Monday; Company Offers Free Yankee Style Auctions", Business Wire, Mar. 12, 1999.*

OpenSite Press Release, "OpenSite Technoligies Unveils OpenSite Auction 4.0", Feb. 8, 1999.*

OpenSite Press Release, "OpenSite Technologies, Inc. Introduces New Auction Services", Apr. 14, 1999.*

Jim Rapoza, "OpenSite is high bidder on Web auctioning", PC Week, Mar. 21, 1999.*

(List continued on next page.)

* cited by examiner

Primary Examiner—Eric W. Stamber
Assistant Examiner—Steven F. Vincent
(74) Attorney, Agent, or Firm—Carstens, Yee & Cahoon; Colin P. Cahoon

(57) ABSTRACT

A method for redeeming collectible points using on-line bidding for promotional items. Promotional points are collected by consumer purchases of products associated with the points or other consumer behavior. Consumers accumulate the points and then redeem them by bidding on promotional items posted for fixed periods of time on an internet site. The method provides for fixed promotional inventory costs as well as the timely collection of consumer preference information. One embodiment of the invention also provides for parental approval of a minor's participation.

38 Claims, 6 Drawing Sheets

OTHER PUBLICATIONS

Richard Karpinski, "OpenSite Lets Enterprises Bid Hello to Auctions", InternetWeek, Apr. 26, 1999.*

Beth Cox, "OpenSite Technologies Delivers Auction 4.0", InternetNews.com, Feb. 12, 1999.*

Gary Gentile, "From Mortgages to Monets, Everything is on the Online Auction Block", Fox Market Wire, Feb. 17, 1999.*

Cyrun Afzali, "OpenSite Auction 4.0 Guide", E–Commerce, May 10, 1999.*

Netcentives Press Release, "ClickRewards Turns Internet Surfers into Customers", Sep. 29, 1997.*

Netcentives Press Release, "Netcentives and Impulse! Buy Network Exclusice Agreement to Expand Promotional Opportunities for Online Merchants", Oct. 20, 1998.*

Deborah Branscum, "Click your way to discounts", Newsweek, Aug. 31, 1998, p. 60.*

Netcentives Press Release, "Internet Shoppers Unanimous: We Want Miles", Sep. 16, 1998.*

"The High Price of Flying Free", Credit Card Management, Dec. 1995, p. 8.*

ClickRewards and ClickRewards@Work Member Agreement (www.clickrewards.com/agreement.html).*-

METHOD OF REDEEMING COLLECTIBLE POINTS

BACKGROUND OF THE INVENTION

1. Technical Field

The present invention relates to a method of redeeming collectible points, and, in particular, to an internet based point redemption method that allows for the quick matching of the redemption of promotional points collected by consumers to promotional items while maintaining a fixed inventory cost for the promotional items. The method allows participants to bid on items offered on-line, thereby minimizing the need for inventory controls and nearly instantly tracking the demand for specific promotional items. The ability to quickly introduce new promotional items provided by the method encourages consumer participation and fosters interest in the promotional program.

2. Description of Related Art

Programs for redeeming collectible points for goods are common product promotional vehicles used by manufacturers and promoters in the retail industry, including the retail food industry. Typically, a consumer purchases a product having affixed to it a coupon representing a number of points that can be collected and redeemed for promotional goods or services, collectively referred to herein as promotional "items." The consumer collects points by purchasing products to which the coupons are affixed, either as part of the product package or contained within the product package. Others in the retail and service industries credit consumers with promotional points on the basis of purchases or other consumer actions that are tracked by the retailer or service provider. Promotional items can be obtained by redeeming a set number of collected points for a specific item offered. Frequently, the promotional items that are offered are tailored to attract a specific market segment of consumers in order to encourage that market segment to purchase the product and reward brand loyalty.

Current methods for redeeming collectible points, however, present several problems for the manufacturer, retailer, service provider, program administrator, or promoter, hereinafter all referred to as the "promoter." In order to maintain interest in a point redemption program, a promoter must periodically update the types of promotional items available. This usually involves offering a limited selection of items for a fixed time period. For example, a portable radio might be offered as a promotional item for a fixed number of redeemable points. In order to make the consumer aware of this item, the portable radio must either be advertised on the retail product container or in a catalog or other source readily available to the consumer. In establishing inventory control, the promoter must take into account the lag-time involved in -getting the promotional information to the consumer. A certain amount of time must also be set aside to allow the consumer to accumulate points over a reasonable time period. Some fixed date or fulfillment period must be provided, however, for the redemption of points for the radio. Otherwise, the promoter would have to maintain the radio in stock indefinitely.

Since the promoter does not know how many points will be collected and redeemed or what promotional items will be selected, an estimation must be made by the promoter as to the number of items to maintain in inventory. This estimation is a difficult task at best, involving predicting the number of redeemable points that will be collected, the percentage of the points collected that will be redeemed for a particular item, and the time period over which the item will generate the most interest. There is very little initial consumer feedback to assist with this process, because, typically, redemption for a particular item arises in-mass near the end of the fulfillment period. If the promoter underestimates the demand, additional promotional items must be purchased. If the promoter overestimates demand, it may be necessary for the promoter find another outlet for excess promotional item inventory. Further, in order to sort out the last minute redemptions at the end of the fulfillment period, the promoter must set aside several weeks to allow for the collection and counting of points, the matching of points to inventory, and the mailing of the promotional inventory back to the consumer. Additional lead time can be encountered when the promotional items afforded are proprietary or exclusive items. Accordingly, it is not unusual for a fulfillment period to take as long as twelve weeks.

All of the above results in a collectible points redemption program that provides consumer preference feedback after it is too late to adjust inventory and exposes the promoter to the risks involved in estimating appropriate promotional item inventory. For example, if too many portable radios were purchased as promotional inventory, they must be disposed. If too few were purchased, additional identical or substitute radios must be located and purchased, regardless of cost, to make up the short-fall. Consequently, promotional inventory is always a variable expense.

Prior art point redemption programs also typically limit the choice of promotional items for a committed time period. This is due to the requirement that a promoter list a given number of promotional items for a given time period, and make all of the required selection of items well in advance of advertising them. Therefore, the promotion is self-limiting without regard to consumer interests. In fact, a consumer might decide not to participate at all in the program if the limited items offered are not of particular interest to that consumer.

Importantly, the time required to collect and redeem points may result in a loss of interest for the program at the start for some consumers. The reality that a promotional item may not arrive until months after the first points are collected can be discouraging. The number of fixed points that must be redeemed for any specific promotional item may also be discouraging to the consumer.

Accordingly, a need exists for a method of redeeming collectible points that eliminates the necessity of estimating inventory levels, encourages consumer participation, and maximizes the effect of offering promotional items in exchange for promotion points. This method should provide quick and accurate feedback on consumer preferences on particular promotional items while, at the same time, streamlining the procedure for collecting points and shortening the lag-time between introducing promotional items and shipping promotional items to the consumer. Ideally, the method should fix inventory costs as much as possible in advance of the redemption period. Parental involvement should also be incorporated when minors are likely to participate in the promotion.

SUMMARY OF THE INVENTION

The present invention comprises methods for redeeming collectible points that eliminate variable inventory costs and the need to project future inventory levels while providing quick consumer preference information. The invention also stimulates interest in a promotional program by introducing a constantly changing selection of promotional items. The invention involves posting a fixed number of promotional items on an internet web page. These items are available for a fixed, and relatively short, period of time. Participants in the promotion establish on-line accounts that track promotion points collected and are allowed to bid on the items. At the end of the fulfillment period for a specific item, the highest bidder is contacted and must then redeem the required points for a particular item within a fixed redemption period.

By redeeming points for a fixed number of inventory items through a bidding method, as opposed to a fixed point redemption level for each item offered, promotional inventory can be maintained on a fixed cost basis. The bidding process also provides real-time information on consumer response to particular promotional items. New promotional items are periodically introduced based on consumer preference responses to past items and to test consumer response to new items.

The ability to offer promotional items for a relatively short time period will also tend to promote consumer interest in the program. The fact that new items are constantly being offered for bid encourages consumers to track the program on a regular basis. The possibility that a desirable item may become available in the future is an incentive to continue in the program even when the items first offered are not of interest to a particular consumer. Such incentive is lost when there is a fixed number of items available for a fixed time period. The program offers the flexibility which allows offering high value items along with lower value items, all available for bid at the same time. The invention also shortens the typical fulfillment period significantly, thereby allowing for quicker consumer gratification.

When the invention is employed such that minors are a potential interested consumer group, parental notification and/or approval safeguards are incorporated. A parent's e-mail address must be provided upon the minor's initial registration into the program. A message is then sent to the parent notifying the parent of the child's participation. A parent's approval might also be obtained before any points are redeemed for an item.

The above as well as additional features and advantages of the present invention will become apparent in the following written detailed description.

BRIEF DESCRIPTION OF THE DRAWINGS

The novel features believed characteristic of the invention are set forth in the appended claims. The invention itself, however, as well as preferred modes of use, further objectives, and advantages thereof, will be best understood by reference to the following detailed description of illustrative embodiments when read in conjunction with the accompanying drawings, wherein:

DETAILED DESCRIPTION

As with prior art redemption programs, points may be collected by consumers removing coupons from retail products, such as food containers or packages. Each coupon represents a given number of points which are collected and redeemed for promotional items. The retail product package will generally have some promotional material affixed to the package alerting the consumer to the collectible coupons and directing the consumer to an internet web page for more information on promotional items and the redemption of collected points. Points might also be collected and credited in a number of different ways, however, depending on the promoter's field of business. For example, points could be gathered electronically when a consumer purchases products or services over the internet and automatically credited to the consumer's point account. Points could be collected by a consumer for mail order purchases through a retail catalog. Points could also be earned and credited based on purchases from a participating service, retailer, or store with a participating credit, debit, or other charge card. It should be understood that, while one embodiment of the invention relates to points collected as a result of a consumer's purchase of retail products, the methods by which the consumer can collect points as applied to the invention are varied and unlimited. In fact, promoters of different retail goods or services could collaborate in allowing points gathered from different promotional programs to be redeemed centrally through one embodiment of the invention. This can be done by allocating the same or different value to points within the auction described below for items eligible to be bid on with all or selected-sourced points.

The invention as described herein is intended to operate on one or more server computers that allow computer network users to participate in a promotional points redemption program. This can be accomplished, for example, by program participants accessing computer readable media on a server computer via the internet. This readable media contains the program instructions for accomplishing various steps described below.

Figure 1:
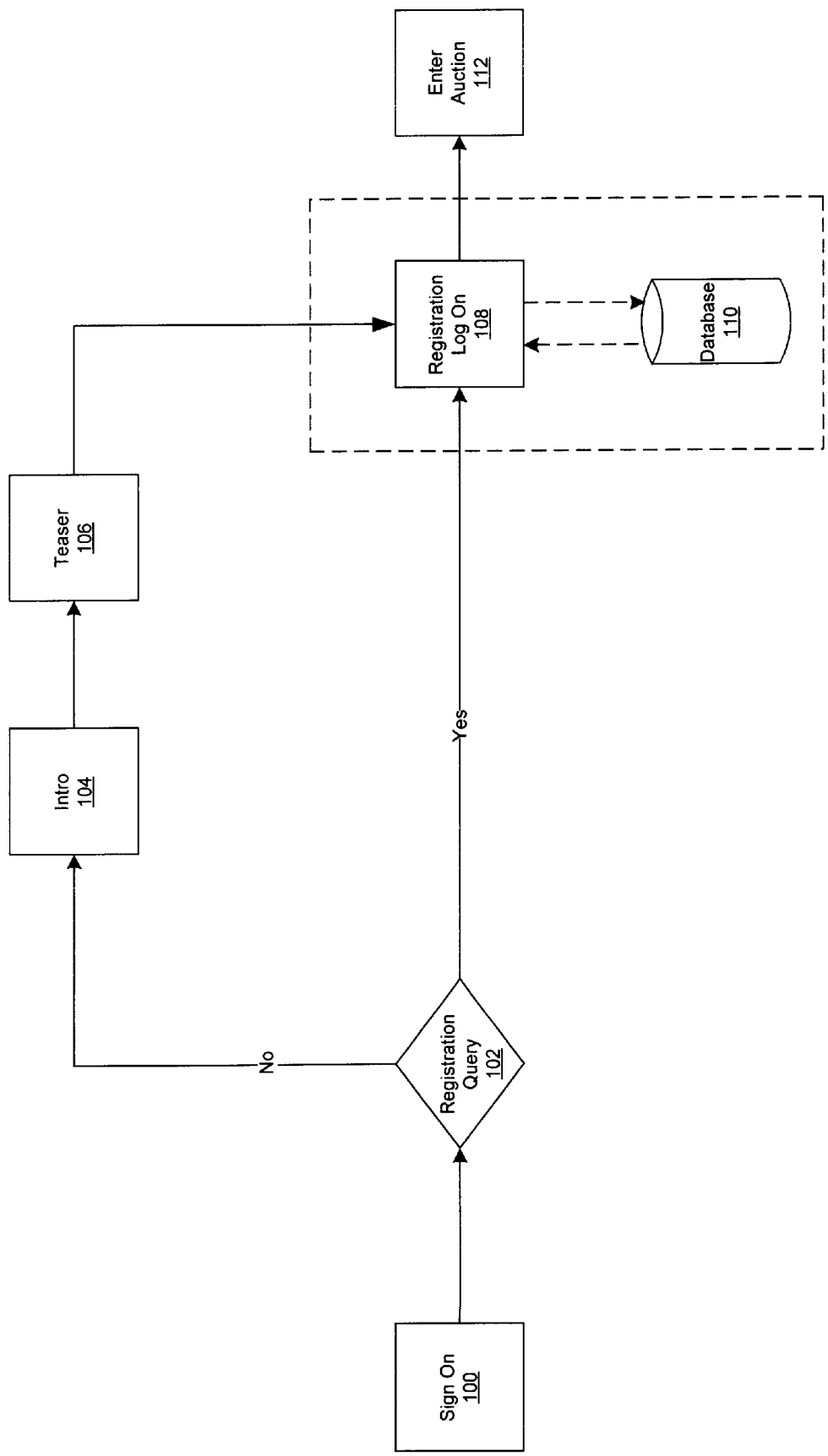
FIG. 1 is a flow chart of the sign-on to auction entry steps of one embodiment of the invention.

FIG. 1 is a flow chart showing the initial sign-on steps involved when a consumer accesses the internet web page as directed by the marketing material found on a retail product package. First, the consumer signs on 100 through the internet and accesses the specific web page as directed. The consumer is then met with a registration query 102. If the consumer indicates that he is not registered, the consumer is then provided with first-time user or non-registered user introductory information 104 and, optionally, then a teaser 106 promoting the portion of the web page that is accessible after registration. The consumer is then directed to the registration/log on step 108. The registration/log on step 108 is interactive with a user database 110. The registration/log on step 108 is described in further detail by the flow charts shown in FIGS. 2a and 2b. Once the registration/log on step 108 is complete, the consumer is considered a registered user and may enter the auction 112 and can begin bidding on promotional items, as will be described in more detail below.

Figure 2A:
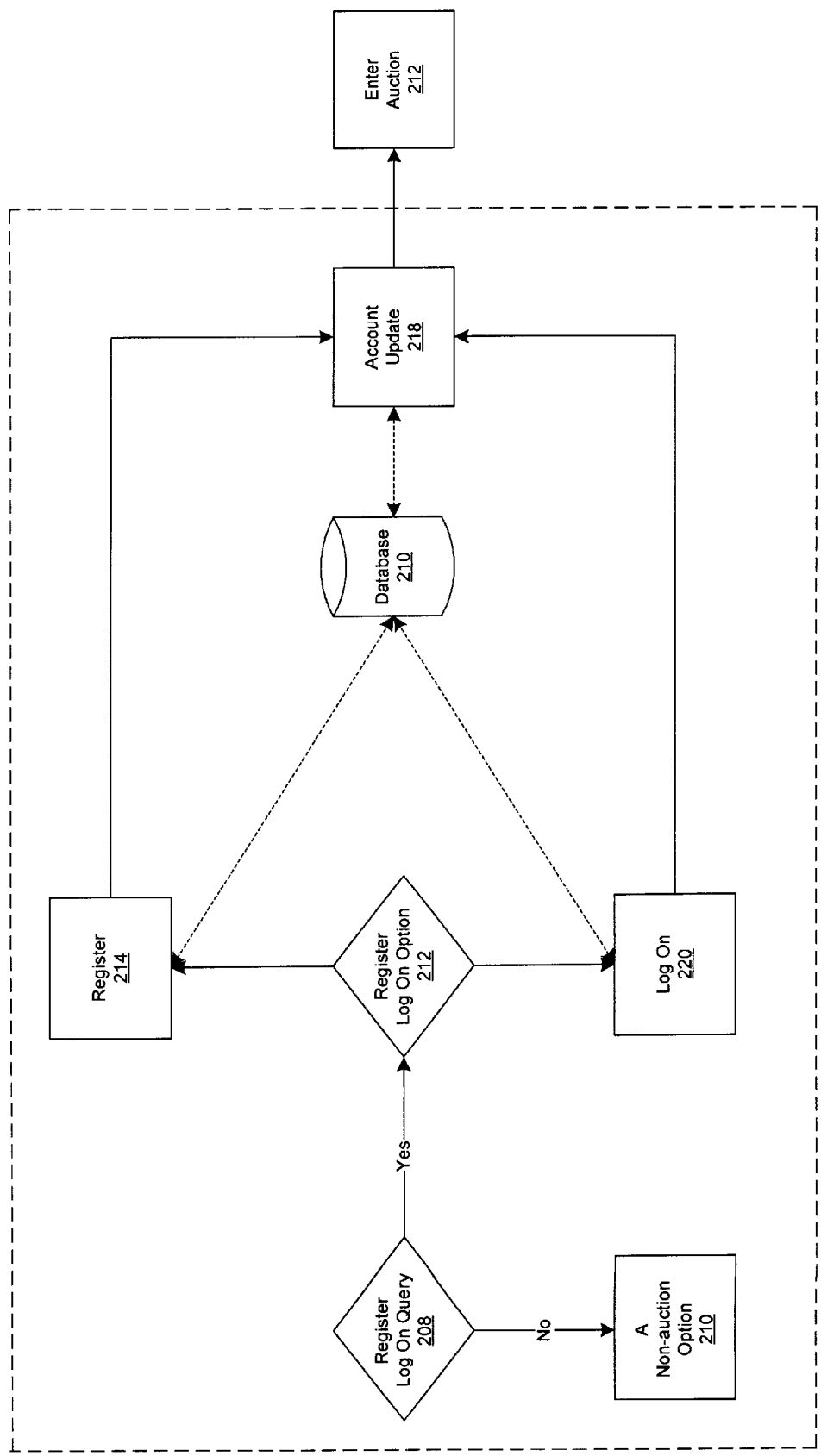
FIGS. 2a and 2b are flow charts of the registration and log on steps of two embodiments of the invention.

FIG. 2a is a flow chart of the registration and the log on steps of one embodiment of the invention. The steps of FIG. 2a contained within the dashed line enclosure are details of the segment of FIG. 1 contained within a dashed line box. The same applies for FIG. 2b.

As shown in FIG. 2a, the consumer is first presented with a query 208 as to whether the consumer wishes to complete the registration/log on procedures. If the consumer responds in the negative, the consumer is then referred to non-auction related options that might be presented on the same web page. For example, the web page may have other promotional games or promotional information regarding the retail product. The page might also have information regarding a traditional prior art redemption program such as a selection of promotional items available by redemption of a fixed number of points. If the consumer affirmatively selects to continue with the registration/log on procedure, the consumer is next provided with the option 212 to either register or log on. A first time user would select the register option 214, which requires that the user input his name, e-mail address, e-mail name, and personalized log on password. The user may also be asked to provide information that might be useful in developing user profiles, such as the user's birthday, gender, residence zip code, and certain household information. All of the information provided during the registration step 214 is stored in a user database 210 and thereafter associated with the user's account.

The user is then asked to provide an account update 218 listing the total amount of redeemable points that the user has collected to date. The number of points entered then becomes the maximum number of points that the user is allowed to bid on any specific item or in the aggregate if the user bids on more than one item at a time, thereby assuring that the user never commits to bidding an amount of points that the user does not presently maintain. The information entered during the account update 218 is also stored in the user database 210.

Had the consumer at the registration/log on option 212 selected the log on option 220 as a registered user, the consumer would then log on 220 using the consumer's user name and password. The user is then asked to update 218 his account to insure that a current number of points is recorded as usable by the user in the database 210. Having updated 218 his account, the user may then start the auction process 212.

In another embodiment, the consumer is initially registered by the promoter by virtue of information the promoter has, such as a charge account with promoter, and eligible points are tracked by the promoter. In this embodiment, a registration step 214 is not necessary and the account update step 218 is replaced with an account status report provided by the promoter.

Figure 2B:
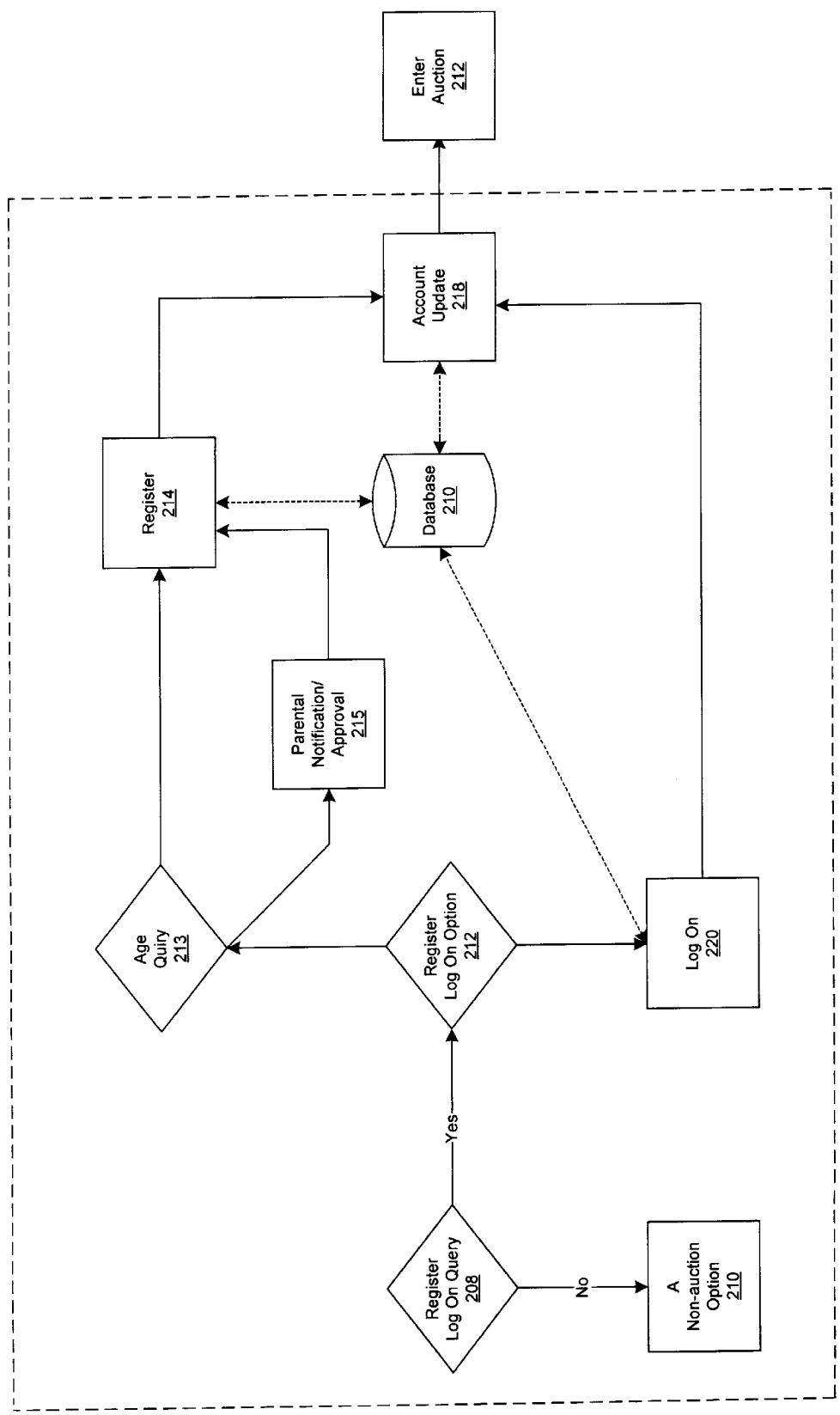

A further alternative embodiment to the invention is illustrated by FIG. 2b. The embodiment shown in FIG. 2b might be used when the promotion involved is likely to attract minors. For the purposes of the described invention, a minor is someone of an age wherein parental participation or consent should be obtained prior to a person's participation in the promotional program or prior to the person providing certain information to the promoter as prescribed by any applicable regulations or laws. Consequently, in the embodiment illustrated in FIG. 2b, after the consumer selects the registration option at the registration/log on step 212, the consumer is next faced with an age query 213. At the age query step 213, the user provides only his name, e-mail address and e-mail name. If the user is a minor, the user will then be required to provide a parent's e-mail address. Depending on the contents of the program and the information required by the promoter to participate, the registration process could then be put on hold pending parental notification and approval 215 or the user could be allowed to continue registration with parental notification. If the latter is the case, an e-mail is sent to the minor's parent notifying the parent of the minor's participation as a user in the program and providing general auction information. The parent is also given information on how to remove the minor from participation if the parent does not approve of the minor participation in the program. A mailed confirmation of the parental notification can also be sent. Once the parental notification 215 is successfully sent, the minor is allowed to register 214, and the process continues as described above with regard to the embodiment illustrated in FIG. 2a.

If parental approval is required because of the nature of the program or the information required at the registration step 214, registration of the minor is suspended until such time that parental approval of the minor's participation is received. Once parental approval is received, the minor registers 214 as previously described.

The auction process is started by the user accessing a home base that displays the current active auctions, auctions that the specific user is involved in, the number of points still available for the user to offer in bid, the user's name, and the current date. From this home base, the user can access specific auction pages or templates or a single page listing all active auctions, all having the same look and function. Each auction item, for example a portable radio, will have its own auction page. The auction page contains information pertaining to the promotional item being auctioned, such as the name of the item, a picture of the item, a description of the item, the current highest bid for the item, the user's most recent bid, and the date and time that the auction for this particular item ends. If the user has more available points than the current highest bid for that item, the user can bid on the item offering a specific number of points. The user database then tracks the commitment of this amount of points from the user's account towards the item up for bid.

Figure 3:
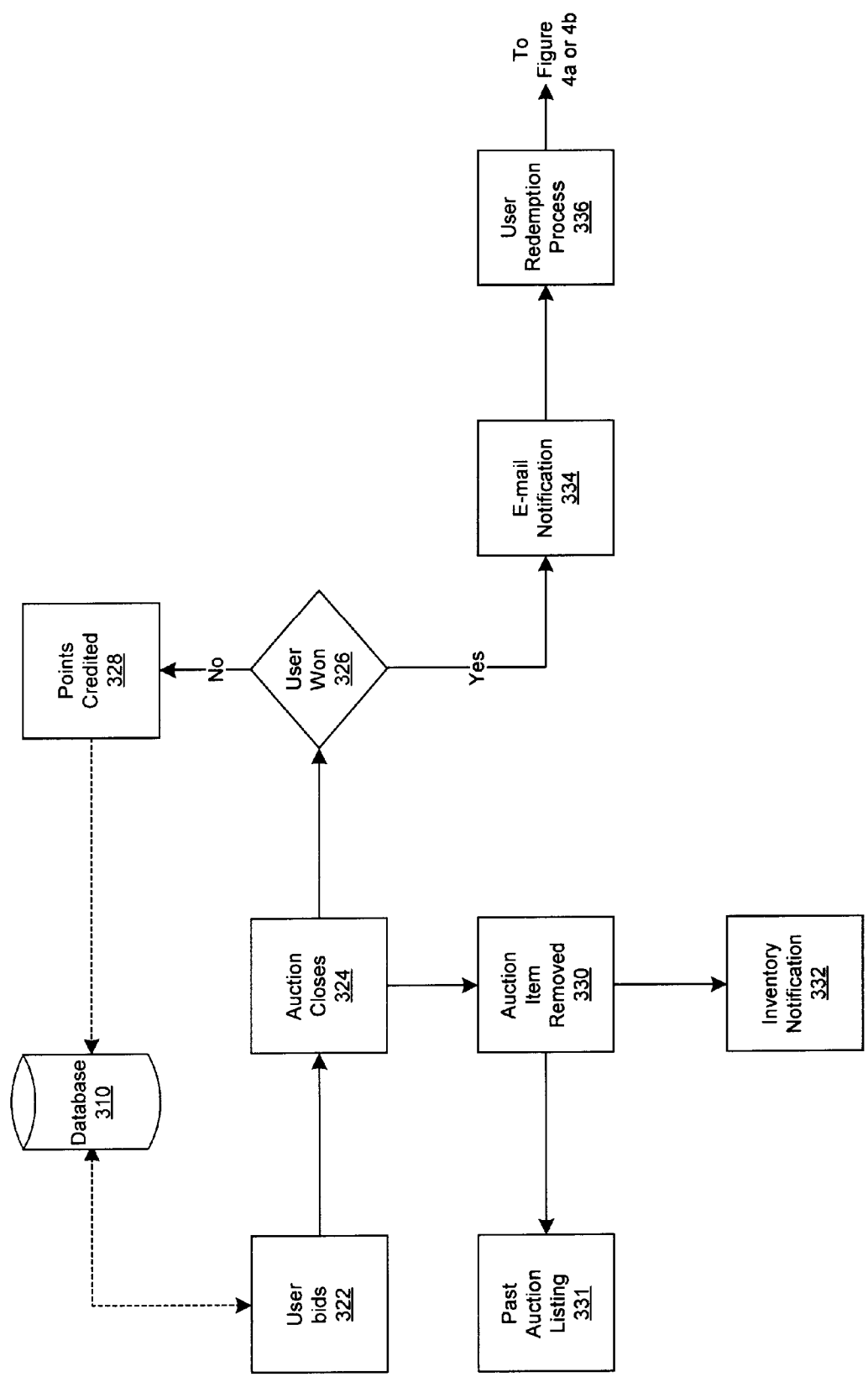
FIG. 3 is a flow chart of the auction steps of one embodiment of the invention.

FIG. 3 is a flow chart of the auction steps of an embodiment of the invention. As noted above, a user can bid 322 on a specific item. This bid is registered in the database 310, thereby committing the number of points bid by the user. At the time provided on the auction page for a specific item, the auction closes 324 for that item. The auction item is then removed 330 from the program as an item up for bid and posted on a past auction listing 331. The past auction listing 331 is a web page providing information about items that have been available for auction in the past. This information can include a description of each item, the highest bid for each item, and, after the redemption process has been completed, the identity of the e-mail name of the highest bidder.

Another step taken after the auction item is removed 330 from auction is an inventory notification 332 to the entity controlling the promotional inventory. For example, this notification may be an e-mail to a fulfillment company set up to verify points and manage promotional inventory delivery. The e-mail will notify the fulfillment company that the item has been removed from the auction, identify the winning bid, and identify the winning bidder. Alternatively, promotional items could be shipped directly from the items' manufacturer, thereby eliminating the need for a fulfillment company, lowering inventory costs, and potentially accelerating the fulfillment process.

When the auction closes 324 a determination is made for each of the bidders as to whether or not they were the highest bidder for that item 326. In the event that a quantity of more than one of the items is offered, for example one hundred portable radios, the like number of highest bidders (one hundred) would be considered to have won the bid for the item. If a user is not determined to have won the bidding, the points put up for bid by the user are credited 328 back to the user as recorded in the database 310. If the user is one of the winning bids, then an email notification 334 is sent to the user. The user is instructed on the procedures to be followed for redeeming points, including a time deadline for redeeming the points. In an embodiment of the invention involving a minor's participation that requires parental notification and/or approval, the notification step 334 would involve notifying not only the user but the user's parents, in which case, the user and parent are instructed on the procedures to be followed for redeeming points. In either event, the user then begins the redemption process 336 illustrated in FIGS. 4a and 4b. If points are administered by the promoter or another entity other than the bidder, that entity will deduct from the bidder's account the designated number of points and authorize shipment of the promotional item.

In another embodiment of the invention, the second highest bidder is also notified and given the option to take a back-up position to the bid in the event that the first bidder does not timely redeem the appropriate number of points. In such event, rather than recycling the bid item, as discussed further below, the second highest bidder takes a first position and completes the redemption process.

Figure 4A:
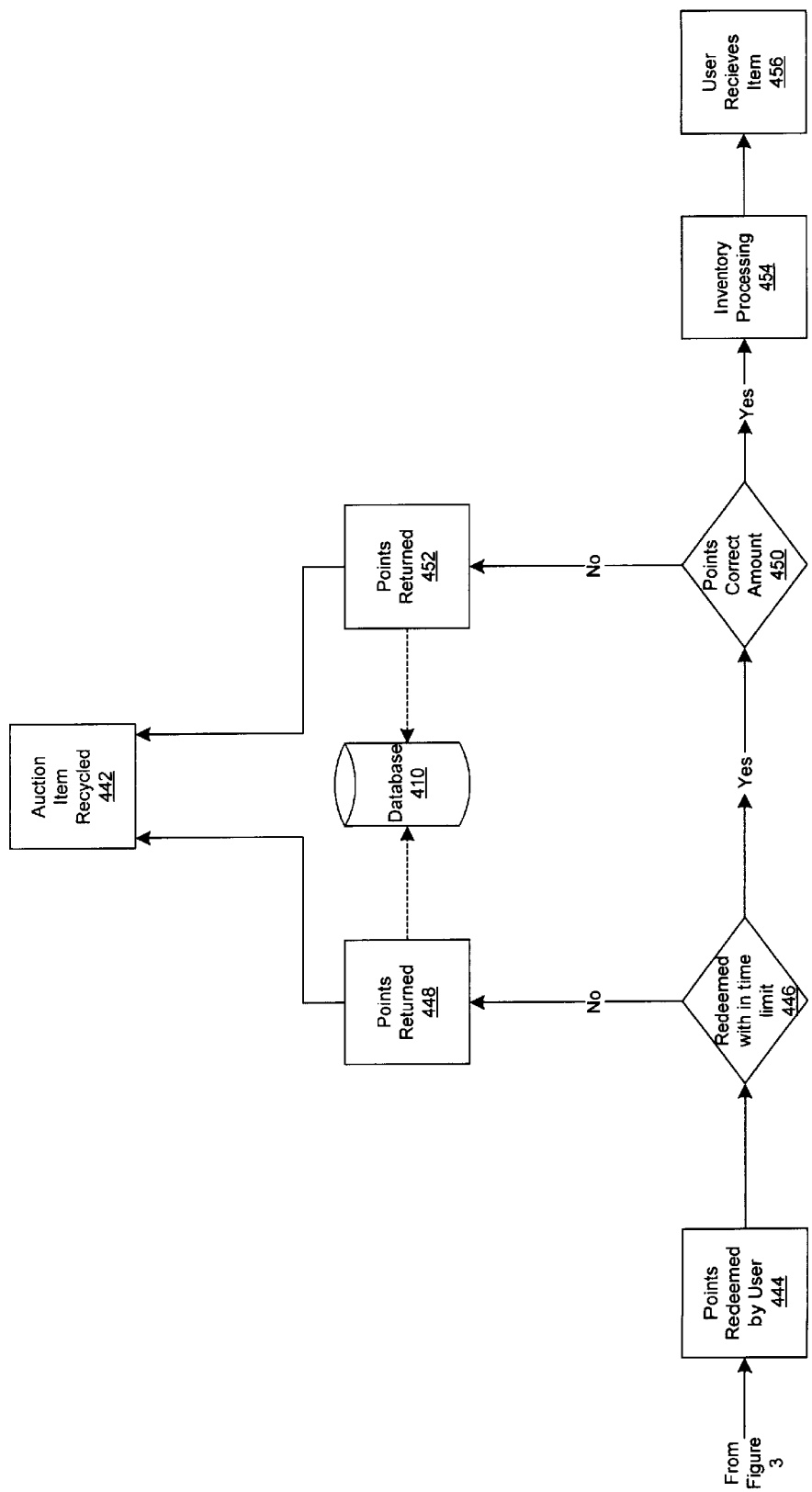
FIGS. 4a and 4b are flow charts of the point redemption steps of two embodiments of the invention.

FIG. 4a is a flow chart of the point redemption steps of one embodiment of the invention. At the close of the auction on a particular item, an e-mail is sent to the user notifying him of the winning bid, number of points bid, and instructions on how to mail the points for redemption. The user must then redeem 444 the necessary points. If the points are not redeemed within the required time limit 446, the points are returned 448 to the user, credited in the user database 410, and the auction item is recycled 442, again becoming available for bid by other users. Alternatively, the auction item may be returned to the item manufacturer or the purchase of the item or insertion of the item in the auction may be voided. If the points were redeemed within the time limit 446, then the collected points are counted to confirm 450 a correct amount has been received. If an inadequate number of points were sent, then the points are returned 452, and credited to the user's account in the database 410, along with a letter of apology. The auction item is then recycled 442 for further bidding, returned to the manufacturer, or its purchase voided. (In the embodiment involving the second highest bidder notification, rather than recycling 442 the auction item in the event points are not timely redeemed or an inadequate number of points are redeemed, the redemption process would start for the second highest bidder.) If the correct amount of points were received, then the inventory is processed 454. This processing 454 might involve a fulfillment company verifying all the information on the user and managing the shipment of the item directly to the user. Finally, the user receives the item 456 for which the redeemable points were originally provided.

Returning to the point confirmation step 450, if a user has twice been identified as winning an auction but failing to provide the adequate number of redeemable points, this user is then removed from the program and banned from participating in future auctions. This information can be tracked by the database 410.

Figure 4B:
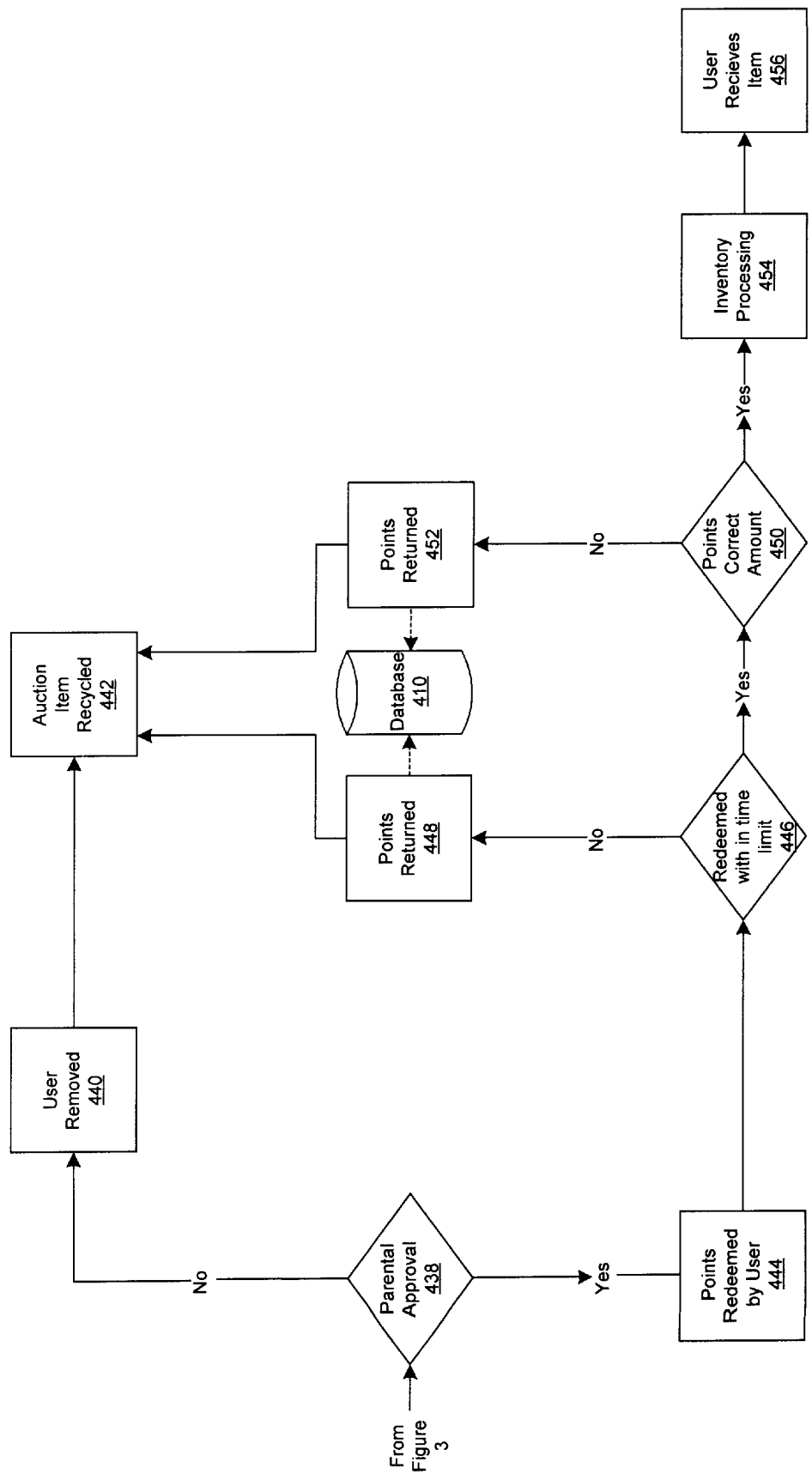

The point redemption steps for one embodiment of the invention involving parental approval of a minor's participation is shown in FIG. 4b. At the close of the auction on a particular item, simultaneous e-mail is sent to both the parent and to the minor notifying them of the winning bid, the number of points bid, and instructions on how to mail the points for redemption. This embodiment then requires a parental approval step 438. If parental approval is not received through either a return e-mail or some other medium, the parent is provided with information on how to remove the minor user 440 from the program. Further, if parental approval is not received, the auction item is recycled 442 and again becomes available for bid by the program users, or is awarded to the second highest bidder, depending on the embodiment used. If parental approval is obtained at the approval step 438, the points are then redeemed 444 by the user and the redemption process continues as described above in relation to FIG. 4a. Alternatively, an embodiment might simply involve notification of the parent of a minor's winning bid and provide information on how the minor can be removed from the program. If the minor is not subsequently removed from the program, parental approval is assumed, and the redemption process proceeds.

Since the method uses real-time bidding procedures, the amount of time allowed for the bidding on a specific item can be rather short, for example, twenty-four hours to one week. The promoter can obtain information on the consumer preference to certain items by tracking the number of bids made on each item over a certain time period as well as the number of points bid on each item. Consequently, the promoter can quickly tailor the types of items offered to best target the desired consumer profile. The interest in specific items can also be cross-referenced to the profile information on the consumers obtained when user accounts are established, thus providing useful consumer preference information on target consumer groups.

Further, consumer interest can be maintained and maximized by virtue of the fact that new items are constantly coming up for bid. Unlike the limited choice, fixed time period redemption programs of the prior art, a consumer will know that other items will always be coming available and may therefore decide to continue to participate in the program even if the present promotional items offered are either of not any particular interest or require more points than the user is willing to offer in bid.

By allowing for the bidding to take place over a fixed amount of time for a fixed number of items, the present invention eliminates the variable inventory costs faced by prior art models. A fixed budget can be established for all promotional items. Some items may capture more redeemable points than expected by the promoter, but this will not affect the inventory cost involved.

It should also be noted that promotional items offered using this method can vary extensively. For example, a drive around the race track with a famous race car driver could be offered as one auction item. A trip to a theme park could be offered as a promotional item. The constant introduction of a wide variety of promotional items stimulates consumer interest in the program and encourages participation. Certain items, such as a portable radio, can be offered in multiple quantities or at fixed point redemption levels with a fixed number of items offered (a first come, first serve redemption) in order to maintain the interest of point collectors who prefer fixed or target redemption goals.

While the invention has been particularly shown and described with reference to preferred embodiments, it will be understood by those skilled in the art that various changes in form and detail may be made therein without departing from the spirit and scope of the invention.

What is claimed is:

1. A method for redeeming promotional points comprising the steps of:
    (a) establishing user accounts reflecting available points collected;
    (b) offering at least one promotional item for bid for a fixed time period;
    (c) allowing bidding of user points on said at least one promotional item;
    (d) tracking user available points during bidding;
    (e) identifying the highest bidder; and,
    (f) redeeming the highest bidder's points in exchange for said at least one promotional item.

2. The method of claim 1 wherein user accounts are established and tracked by a promoter.

3. The method of claim 1 wherein step (a) further comprises providing parental notification of a minor's establishment of an account.

4. The method of claim 1 further comprising the step of:
   (g) deducting said highest bidder's points from said bidder's user account.

5. The method of claim 1 wherein step (f) further comprises obtaining parental approval of a minor's redemption of points for said at least one promotional item.

6. The method of claim 1 wherein, after the highest bidder is identified in step (e), said bidder is allowed in step (f) a fixed time period during which to redeem the number of points bid in exchange for said at least one promotional item.

7. The method of claim 6 wherein the promotional item is recycled for bid if said highest bidder does not timely redeem the number of points bid.

8. The method of claim 6 wherein a user who has at least once been identified as the highest bidder and has failed at least once to redeem the number of pints bid during the fixed time period is thereafter prohibited from bidding on promotional items.

9. The method of claim 1 wherein the bidding occurs over the internet.

10. The method of claim 1 wherein step (a) occurs on-line via the internet with available points collected data provided by the user.

11. The method of claim 1 wherein step (a) comprises the user providing the user's name, birth date, zip code, gender, password, and e-mail address as user account information.

12. The method of claim 11 wherein the user provides a parent's e-mail address.

13. The method of claim 12 wherein notification of establishment of an account and identification of a highest bidder are provided to a parent's e-mail address.

14. The method of claim 11 wherein user account information is correlated with user bidding to identify user promotional item preferences for targeted user profiles.

15. A method for redeeming promotional points reflected on coupons removed from retail products by consumers of said retail products for promotional items comprising an internet based promotional items bidding auction, wherein available promotional points data is provided by users prior to bidding and the availability of the winning points bid is confirmed by redemption of coupons reflecting the total points bid.

16. The method of claim 15 further comprising parental notification of a minor's participation in said bidding auction.

17. The method of claim 16 further comprising parental approval of a minor's redemption of points for a promotional item.

18. The method of claim 15 wherein the time allowed for a user to redeem coupons reflecting the bid points total is limited to a time fixed from the date a user is notified of the winning bid.

19. The method of claim 18 wherein an item is recycled for further bidding if points are not redeemed during the time allowed for a user to redeem coupons reflecting the bid total points.

20. The method of claim 18 wherein a user who has at least once been notified of a winning bid and has at least once failed to redeem coupons reflecting the bid points total during the time allowed is thereafter prohibited from bidding on promotional items.

21. The method of claim 15 wherein users establish accounts that are accessible on-line.

22. The method of claim 21 wherein available points are tracked and identified to each user's account using a user information database.

23. A method for redeeming collectible points promoting retail products, said method comprising the steps of:
   (a) providing coupons reflecting redeemable points to consumers with the purchase of retail products;
   (b) directing consumers to an internet site for information on redeeming said points;
   (c) providing an internet site listing promotional items available by means of a points auction;
   (d) conducting a collected points auction of promotional items on-line; and,
   (e) providing for the redemption of collected points bid for promotional items from the highest bidders, wherein each highest bidder exchanges coupons reflecting the points bid for a promotional item.

24. The method of claim 23 wherein consumers must establish on-line user accounts prior to participating in the auction of step (d).

25. The method of claim 24 wherein a parent is notified of a minor's establishment of a user account.

26. The method of claim 25 wherein said notification occurs by e-mail.

27. The method of claim 23 wherein parental approval is obtained prior to a minor's participation in the auction of step (d).

28. The method of claim 23 wherein step (e) further comprises allowing the redemption of collected points during a specified time period from the date of notification to the highest bidder of the winning bid.

29. The method of claim 28 wherein the item is recycled for bid if the promotional points are not redeemed within said time period.

30. The method of claim 28 wherein a highest bidder who has at least once failed to redeem points bid during said specified time period is thereafter prohibited from participation in said collected points auction.

31. A computer readable medium containing program instructions for:
   (a) establishing user accounts reflecting available points collected;
   (b) offering at least one promotional item for bid for a fixed time period;
   (c) allowing bidding of user points on said at least one promotional item;
   (d) tracking user available points during bidding; and
   (e) identifying the highest bidder.

32. The computer readable medium of claim 31 further containing program instructions for:
   (f) deducting said highest bidder's points bid from said bidder's user account.

33. The computer readable medium of claim 31 further containing program instructions for:
   (f) extrapolating user preference for promotional items from user bidding in order to tailor the types of items offered for future bidding to best target a desired consumer profile.

34. A method using a server computer to allow computer network users to participate in a promotional points redemption program, said method comprising the steps of:
   (a) establishing user accounts reflecting available points collected;
   (b) offering at least one promotional item for bid for a fixed time period;

(c) allowing bidding of user points on said at least one promotional item;
(d) tracking user available points during bidding;
(e) identifying the highest bidder; and,
(f) redeeming the highest bidder's points in exchange for said at least one promotional item.

35. The method of claim 34 wherein user accounts are established in step (a) by the user inputting information, including available points collected, on the server computer.

36. The method of claim 34 wherein user accounts are established in step (a) by the promoter inputting information on the server computer.

37. The method of claim 34 wherein the user accounts of step (a) comprise data providing consumer profile information to the promoter.

38. The method of claim 37 further comprising the steps of:

(g) correlating consumer promotional item preference with consumer profiles in order to tailor the types of items offered for future bidding to best target a desired consumer profile.

* * * * *